United States Patent
Tsutsui

(10) Patent No.: US 8,639,269 B2
(45) Date of Patent: Jan. 28, 2014

(54) WIRELESS COMMUNICATION SYSTEM, WIRELESS BASE STATION, MOBILE TERMINAL, WIRELESS COMMUNICATION METHOD, AND PROGRAM

(75) Inventor: Takahiro Tsutsui, Minato-ku (JP)

(73) Assignee: NEC Corporation, Tokyo (JP)

(*) Notice: Subject to any disclaimer, the term of this patent is extended or adjusted under 35 U.S.C. 154(b) by 44 days.

(21) Appl. No.: 13/128,690

(22) PCT Filed: Nov. 11, 2009

(86) PCT No.: PCT/JP2009/069162
§ 371 (c)(1),
(2), (4) Date: May 11, 2011

(87) PCT Pub. No.: WO2010/067686
PCT Pub. Date: Jun. 17, 2010

(65) Prior Publication Data
US 2011/0217993 A1 Sep. 8, 2011

(30) Foreign Application Priority Data
Dec. 10, 2008 (JP) ................. 2008-314748

(51) Int. Cl.
*H04W 24/00* (2009.01)
(52) U.S. Cl.
USPC ........ 455/456.5; 370/230; 370/231; 370/235; 370/329; 370/341; 455/412.2; 455/414.1; 455/424; 455/432.3; 455/561
(58) Field of Classification Search
USPC ......... 455/7, 41.2, 410, 422.1, 434, 458, 561, 455/412.2, 414.1, 424, 432.3, 456.5; 714/807, 819; 370/230, 231, 235, 254, 370/329, 341, 349
See application file for complete search history.

(56) References Cited

U.S. PATENT DOCUMENTS

| 2004/0073901 A1 | 4/2004 | Imamatsu | |
| 2006/0280144 A1* | 12/2006 | Kangas | 370/329 |

(Continued)

FOREIGN PATENT DOCUMENTS

| JP | 2000-10787 A | 1/2000 |
| JP | 2000-276337 A | 10/2000 |

(Continued)

OTHER PUBLICATIONS

3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN) (Release 8), 3GPP TS 36.300 V8.6.0 (Sep. 2008), pp. 1-8.

(Continued)

*Primary Examiner* — Wesley Kim
*Assistant Examiner* — Dinh P Nguyen
(74) *Attorney, Agent, or Firm* — Sughrue Mion, PLLC

(57) ABSTRACT

A wireless communication system includes a mobile terminal and a wireless base station that transmits to the mobile terminal notification information that is used for establishing a call between the mobile terminal and the wireless base station. The mobile terminal transmits identification information of predetermined notification information to the wireless base station. The wireless base station compares the identification information that was transmitted in from the mobile terminal and the identification information of the notification information of the current transmission, and based on the result of the comparison, transmits to the mobile terminal information for acquiring the notification information of the current transmission.

19 Claims, 10 Drawing Sheets

(56) References Cited

U.S. PATENT DOCUMENTS

2008/0125043 A1* 5/2008 Karmanenko et al. ....... 455/41.2
2009/0046592 A1 2/2009 Aoyama et al.

FOREIGN PATENT DOCUMENTS

| JP | 2001-78258 A | 3/2001 |
| --- | --- | --- |
| JP | 2001-169332 A | 6/2001 |
| JP | 2002-251350 A | 9/2002 |
| JP | 2003-153324 A | 5/2003 |
| JP | 2003-244284 A | 8/2003 |
| JP | 2008-136151 A | 6/2008 |
| WO | 2007/052769 A1 | 5/2007 |

OTHER PUBLICATIONS $3^{rd}$ Generation Partnership Project; Technical Specification Group Radio Access Network; UTRAN overall description (Release 8), 3GPP TS 25.401 V8.1.0 (Sep. 2008), pp. 1-13.

$3^{rd}$ Generation Partnership Project; Technical Specification Group Radio Access Network; Evolved Universal Terrestrial Radio Access (E-UTRA) Radio Resource Control (RRC) Protocol Specification (Release 8), 3GPP TS 36.331 V8.3.0 (Sep. 2008), pp. 1-27.

Office Action issued Jul. 10, 2012, by the Japanese Intellectual Property in counterpart Japanese Application No. JP 2010-542065.

* cited by examiner

FIG. 7

| Alteration History of Past Notification Information | Value of Value Tag | Implementation / Non-implementation of Call Establishment |
|---|---|---|
| Last time | 5 | Implemented |
| Time before last | 4 | Not implemented |
| : | : | : |

WIRELESS COMMUNICATION SYSTEM, WIRELESS BASE STATION, MOBILE TERMINAL, WIRELESS COMMUNICATION METHOD, AND PROGRAM

CROSS REFERENCE TO RELATED APPLICATIONS

This application is a National Stage of International Application No. PCT/JP2009/069162, filed on Nov. 11, 2009, which claims priority from Japanese Patent Application No. 2008-314748, filed on Dec. 10, 2008, the contents of all of which are incorporated herein by reference in their entirety.

TECHNICAL FIELD

The present invention relates to a wireless communication system, a wireless base station, a mobile terminal, a wireless communication method, and a program.

BACKGROUND ART

The UTRAN (Universal Terrestrial Radio Access Network) is currently standardized in the 3GPP ($3^{rd}$ Generation Partnership Projects).

FIG. 1 shows an example of the architecture of a wireless communication system in which UTRAN is applied.

As shown in FIG. 1, UTRAN 60 is connected to core network 50. In addition, UTRAN is composed of a plurality of RNS (Radio Network Subsystems) 70.

Each of RNS 70 is made up from RNC (Radio Network Controller) 80 and a plurality of NodeB 90 that are wireless base stations. NodeB 90 carries out wireless communication with UE (User Equipment) 10, which is a mobile terminal.

In addition, UTRAN LTE (Long Term Evolution) is being investigated in recent 3GPP standardization with the aim of maintaining the competitiveness of UTRAN with the development of other wireless communication technologies such as wireless LAN (Local Area Networks) (Non-Patent Document 1).

FIG. 2 shows an example of the architecture of a wireless communication system in which UTRAN LTE is applied.

As shown in FIG. 2, in UTRAN LTE, UTRAN is made up by a plurality of eNB 20 that are wireless base stations realized by unifying RNC and Node B.

In UTRAN LTE, UTRAN is defined as E-UTRAN (Evolution-UTRAN) 30, and the core network and control functional unit are defined as MME (Mobility Management Entity) 40.

In UTRAN LTE, the interface between eNB 20 and MME 40 is defined as S1, the interface between eNB 20 is defined as X2, and the interface between eNB 20 and UE 10 is defined as Uu.

As described above, the unification of RNC and NodeB in UTRAN LTE results in a decrease of the number of nodes of E-UTRAN 30 compared to UTRAN 60 of FIG. 1.

The reduction of the number of nodes in UTRAN LTE results in a corresponding decrease of the setting delay of connections between UE 10/eNB 20/MME 40 for realizing communication by UE 10 (Non-Patent Document 2). This reduction is realized because the setting of connections between RNC 80/NodeB 90 in UTRAN 60 of FIG. 1 is unnecessary in E-UTRAN 30 of FIG. 2.

However, UE 10 must receive notification information that is distributed by broadcast from eNB 20 in order to establish a call with eNB 20. The notification information is the minimum necessary setting information for establishing a call by UE 10 and includes, for example, a parameter indicating the transmission power of the transmission signal from UE 10 to eNB 20 and a parameter indicating regulation information relating to the regulation of access from UE 10 to eNB 20.

For example, UE 10 receives notification information upon activation of UE 10, cell reselection, completion of handover, recovery from coverage, and alteration of notification information (Non-Patent Document 3).

FIG. 3 shows an example of the notification information reception sequence in UTRAN LTE.

As shown in FIG. 3, when altering notification information, eNB 20 appends information communicating the alteration of notification information to a paging signal and transmits an RRC (Radio Resource Control) message of the paging signal to UE 10 in Step E11.

After receiving the RRC message of the paging signal to which information has been appended that reports the alteration of notification information from eNB 20, UE 10 receives the RRC message of the notification information that has been altered in Steps E12-E14.

The notification information is composed of MIB (Master Information Block), SIBtype1 (System Information Block Type1), and SI (System Information). The above-described parameters are appended to the SIBtype1 or SI.

When the notification information has been altered, UE 10 receives the MIB and SIBtype1, or alternatively, receives the SI only when the System Information Value Tag (hereinbelow referred to as the Value Tag) of the SIBtype1 differs from the Value Tag of the notification information before alteration. The Value Tag is identification information for identifying notification information, and for example, is the version number of the notification information.

Based on the notification information that was received as described above, UE 10 then carries out processes for establishing the call with eNB 20, i.e., for establishing an RRC Connection.

FIG. 4 shows an example of the RRC Connection establishment sequence in UTRAN LTE.

As shown in FIG. 4, UE 10 first transmits a RACH (Random Access Characteristic) Preamble message to eNB 20 in Step F11, and then receives a RACH Response message from eNB 20 in Step F12. By means of this RACH procedure, UE 10 acquires an ID for transmitting the RRC message.

UE 10 next transmits an RRC Connection Request message requesting the establishment of a call to eNB 20 in Step F13.

When the call is to be established, eNB 20 transmits an RRC Connection Setup message that establishes the call to UE 10 in Step F14.

Then, when the call has been established, UE 10 transmits an RRC Connection Setup Complete message reporting that the establishment of the call has been completed to eNB 20 in Step F15.

LITERATURE OF THE PRIOR ART

Non-Patent Documents

Non-Patent Document 1: E-UTRA and E-UTRAN; Overall Description [3GPP TS 36.300 V8.6.0 (2008 September)]
Non-Patent Document 2: UTRAN Overall Description [3GPP TS 25.401 V8.1.0 (2008 September)]
Non-Patent Document 3: E-UTRA RRC Protocol Specification [3GPP TS 36.331 V8.3.0 (2008 September)]

SUMMARY OF THE INVENTION

Problem to be Solved by the Invention

However, when radio-wave reception quality is poor, the danger arises that UE 10 is unable to receive the paging signal to which information reporting the alteration of notification information has been appended, or may receive erroneous information regarding the alteration of notification information.

In such cases, the problem arises that UE 10 remains unaware of alteration of the notification information and is unable to acquire notification information of the current transmission.

It is therefore an object of the present invention to provide a wireless communication system, a wireless base station, a mobile terminal, a wireless communication method, and a program that can solve the above-described problems and that enable a mobile terminal to acquire the notification information of the current transmission.

Means for Solving the Problem

The wireless communication system of the present invention is a wireless communication system that includes a mobile terminal and a wireless base station that transmits by wireless to the mobile terminal notification information that is used for establishing a call between the wireless base station and the mobile terminal; wherein:

the mobile terminal transmits identification information of predetermined notification information to the wireless base station; and the wireless base station compares the identification information that was transmitted in from the mobile terminal with the identification information of the notification information of the current transmission, and based on the result of comparison, transmits to the mobile terminal information for acquiring the notification information of the current transmission.

The wireless base station of the present invention is a wireless base station that transmits to a mobile terminal notification information that is used for establishing a call between the mobile terminal and the wireless base station, the wireless base station including:

a receiver that receives from the mobile terminal identification information that identifies predetermined notification information;

a control unit that compares the identification information that was received from the mobile terminal with identification information of the notification information of the current transmission; and a transmitter that both transmits notification information to the mobile terminal and, based on the result of the comparison, transmits to the mobile terminal information for acquiring the notification information of the current transmission.

The mobile terminal of the present invention is a mobile terminal that receives from a wireless base station notification information that is used for establishing a call between the wireless base station and the mobile terminal; the mobile terminal including:

a transmitter that transmits to the wireless base station identification information that identifies predetermined notification information; and a receiver that both receives notification information from the wireless base station and, when the identification information that was transmitted to the wireless base station and the identification information of the notification information of the current transmission do not match, receives from the wireless base station information for acquiring the notification information of the current transmission.

The first wireless communication method of the present invention is a wireless communication method realized by a wireless communication system that includes a mobile terminal and a wireless base station that transmits to the mobile terminal notification information that is used for establishing a call between the mobile terminal and the wireless base station; the wireless communication method including steps of:

the mobile terminal transmitting to the wireless base station identification information that identifies predetermined notification information;

the wireless base station comparing identification information that was transmitted in from the mobile terminal and identification information of the notification information of the current transmission; and the wireless base station, based on the result of the comparison, transmitting to the mobile terminal information for acquiring the notification information of the current transmission.

The second wireless communication method of the present invention is a wireless communication method realized by a wireless base station that transmits to a mobile terminal notification information used for establishing a call between the mobile terminal and the wireless base station, the wireless communication method including steps of:

receiving from the mobile terminal identification information that identifies predetermined notification information;

comparing the identification information that was received from the mobile terminal and identification information of the notification information of the current transmission; and based on the result of the comparison, transmitting to the mobile terminal information for acquiring the notification information of the current transmission.

The third wireless communication method of the present invention is a wireless communication method realized by a mobile terminal that receives from a wireless base station notification information that is used for establishing a call between the wireless base station and the mobile terminal, the wireless communication method including steps of:

transmitting to the wireless base station identification information that identifies predetermined notification information; and when the identification information that was transmitted to the wireless base station does not match identification information of the notification information of the current transmission, receiving information for acquiring the notification information of the current transmission.

The first program of the present invention causes a wireless base station that transmits to a mobile terminal notification information that is used to establish a call with the mobile terminal and the wireless base station to execute procedures of:

receiving from the mobile terminal identification information that identifies predetermined notification information;

comparing identification information that was received from the mobile terminal and identification information of the notification information of the current transmission; and based on the result of the comparison, transmitting to the mobile terminal information for acquiring the notification information of the current transmission.

The second program of the present invention causes a mobile terminal that receives from a wireless base station notification information that is used for establishing a call between the wireless base station and the mobile terminal to execute procedures of:

transmitting to the wireless base station identification information that identifies predetermined notification information; and when the identification information that was transmitted to the wireless base station does not match with identification information of the notification information of the current transmission, receiving from the wireless base station information for acquiring the notification information of the current transmission.

Effect of the Invention

According to the present invention, a mobile terminal transmits to a wireless base station identification information of predetermined notification information, the wireless base station compares the identification information that was transmitted in from the mobile terminal and identification information of the notification information of the current transmission, and based on the comparison result, transmits to the mobile terminal information for acquiring the notification information of the current transmission.

The effect is therefore obtained that the mobile terminal, based on information that is transmitted in from the wireless base station, is able to acquire the notification information of the current transmission.

BRIEF DESCRIPTION OF THE DRAWINGS

FIG. 7 is a view for describing an example of the notification information alteration history table of the present exemplary embodiment;

BEST MODE FOR CARRYING OUT THE INVENTION

A best mode of carrying out the present invention is next described with reference to the accompanying drawings.

Figure 2:
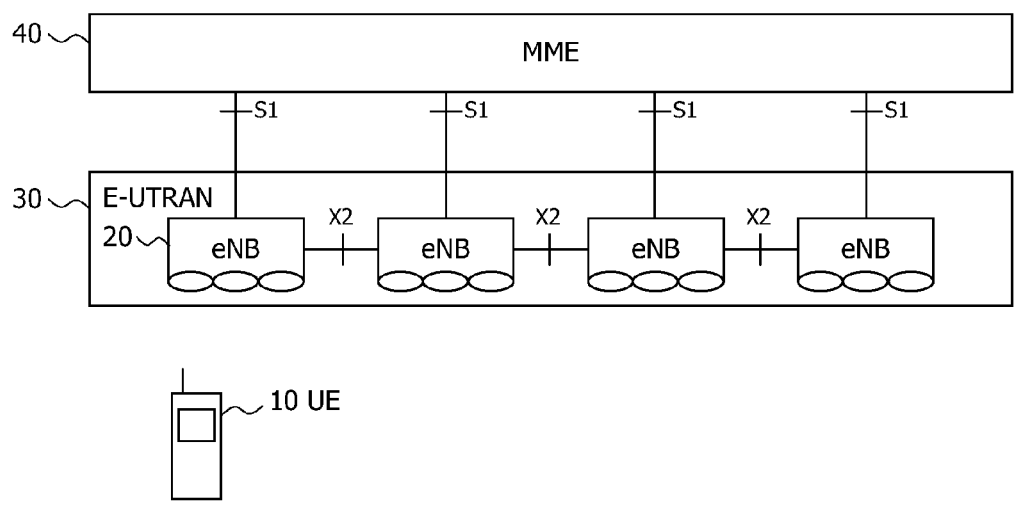
FIG. 2 shows an example of the architecture of a wireless communication system in which UTRAN LTE is applied.

In the exemplary embodiment described hereinbelow, the overall configuration of the wireless communication system is assumed to be identical to the wireless communication system in FIG. 2 in which UTRAN LTE is applied.

Figure 5:
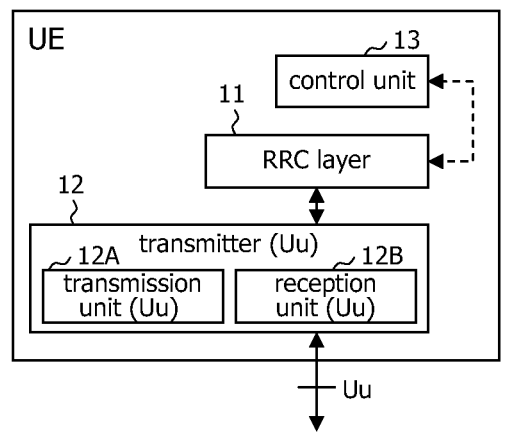
FIG. 5 is a block diagram showing an example of the configuration of a UE of the present exemplary embodiment.
Figure 6:
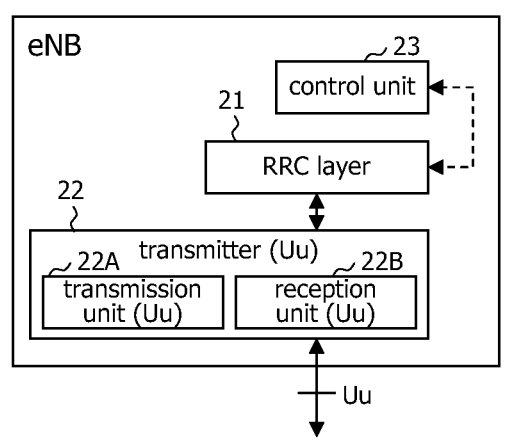
FIG. 6 is a block diagram showing an example of the configuration of an eNB of the present exemplary embodiment.

Referring to FIGS. 5 and 6, details of the configuration of each of the nodes UE 10 and eNB 20 of the present exemplary embodiment are shown.

As shown in FIG. 5, UE 10 of the present exemplary embodiment includes RRC layer 11, transmitter (Uu) 12, and control unit 13.

RRC layer 11 is a processor that implements an RRC message decryption process and an RRC message generation process.

Transmitter (Uu) 12 includes transmission unit (Uu) 12A that transmits messages to the Uu interface and reception unit (Uu) 12B that receives notification information and messages from the Uu interface.

Control unit 13 instructs RRC layer 11 to generate RRC messages. Control unit 13 further implements necessary processing based on the results of decryption of RRC messages from RRC layer 11.

More specifically, RRC layer 11 generates an RRC message in which the Value Tag of predetermined notification information such as notification information that is held in UE 10 is set, and transmission unit (Uu) 12A transmits this RRC message to eNB 20 by way of the Uu interface.

If the Value Tag of the notification information that was transmitted to eNB 20 does not match the Value Tag of the current wireless transmission, an RRC message in which information is set for acquiring the notification information of the current transmission is transmitted in from eNB 20, and control unit 13 further acquires the notification information of the current transmission based on this information.

The information for acquiring the notification information of the current transmission is either (1) or (2) shown below, and further details will be later described.

(1) Information requesting the reacquisition of notification information (2) Information of the difference between the notification information that is being held in UE 10 and notification information of the current transmission and the Value Tag of the notification information of the current transmission As shown in FIG. 6, eNB 20 of the present exemplary embodiment includes RRC layer 21, transmitter (Uu) 22, and control unit 23.

RRC layer 21 is a processor that implements an RRC message decryption process and an RRC message generation process.

Transmitter (Uu) 22 includes transmission unit (Uu) 22A that transmits notification information and messages to the Uu interface and reception unit (Uu) 22B that receives messages from the Uu interface.

Control unit 23 instructs RRC layer 21 to generate messages. Control unit 23 further implements necessary processing based on the results of the decryption of RRC messages from RRC layer 21.

More specifically, control unit 23 carries out comparison to determine whether a Value Tag that was transmitted in from UE 10 matches the Value Tag of the notification information of the current wireless transmission.

If the Value Tag that was transmitted in from UE 10 does not match the Value Tag of the notification information of the current transmission, RRC layer 21 generates an RRC message in which information is set for acquiring the notification information of the current transmission, and transmission unit (Uu) 22A transmits this RRC message to UE 10 by way of the Uu interface.

Control unit 23 further implements a process for setting and saving the alteration history of past notification information that was previously transmitted by wireless in a notification information alteration history table such as shown in FIG. 7.

In the notification information alteration history table shown in FIG. 7, Value Tag values of past notification information that was previously transmitted by wireless are set in correspondence with information that determines the implementation or non-implementation of call establishment with UE 10 that holds the Value Tag.

When setting implementation or non-implementation of call establishment, implementation of call establishment is set when parameters that relate to regulation information are not contained in the difference between the notification information of the current transmission and past notification information that was transmitted at corresponding Value Tag values, and non-implementation of call establishment is set if parameters relating to regulation information are contained.

Four examples of the RRC Connection establishment sequence in the wireless communication system of the present exemplary embodiment are next described.

First Example

Figure 8:
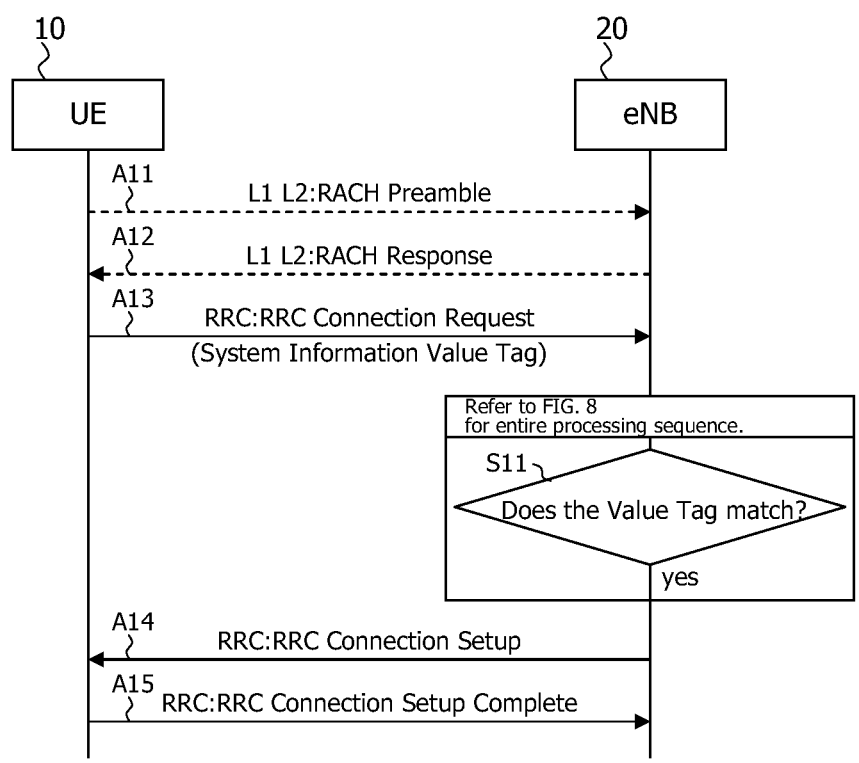
FIG. 8 is a sequence chart for describing a first example of the RCC Connection establishment sequence in the wireless communication system of the present exemplary embodiment.

FIG. 8 shows the RRC Connection establishment sequence in the present example.

Figure 11:
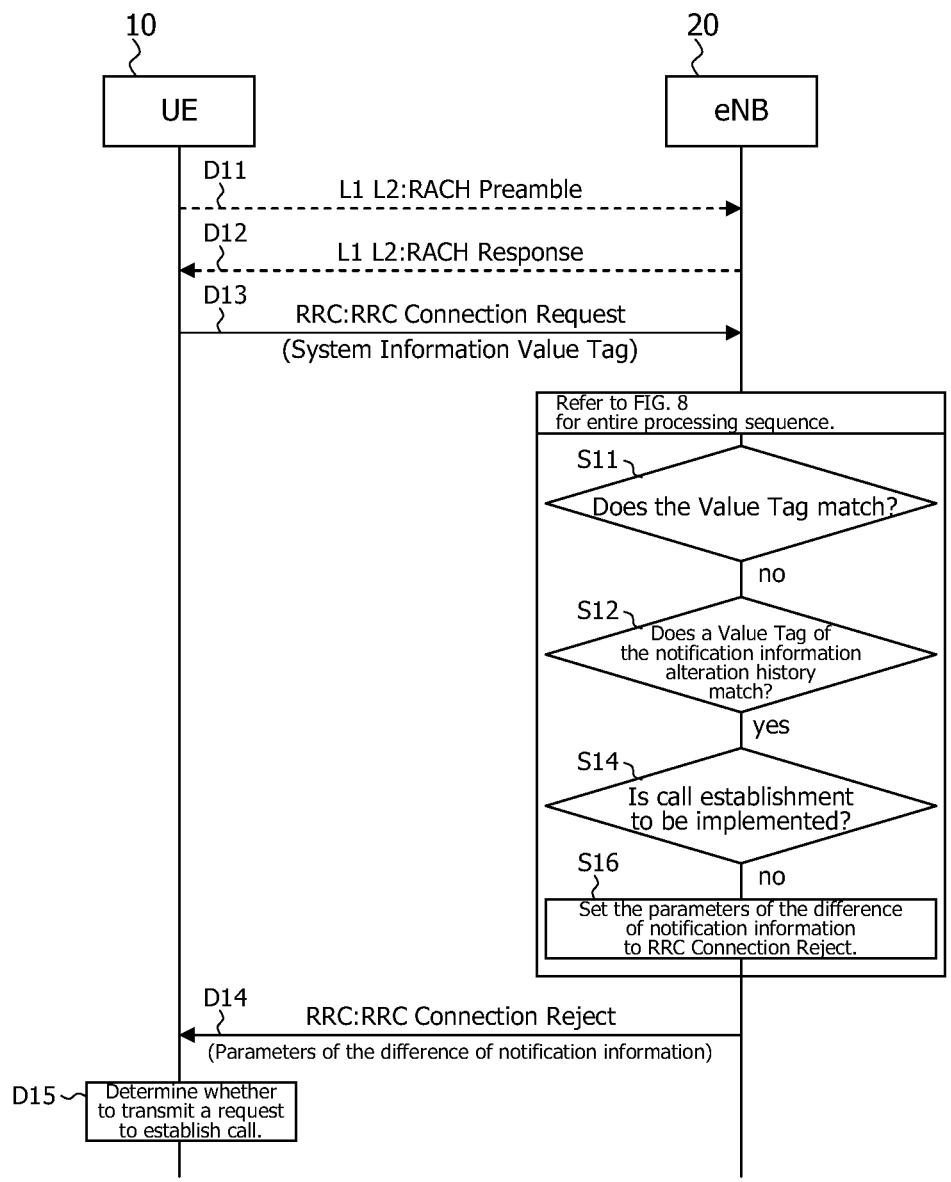
FIG. 11 is a sequence chart for describing a fourth example of the RRC Connection establishment sequence in the wireless communication system of the present exemplary embodiment.
Figure 12:
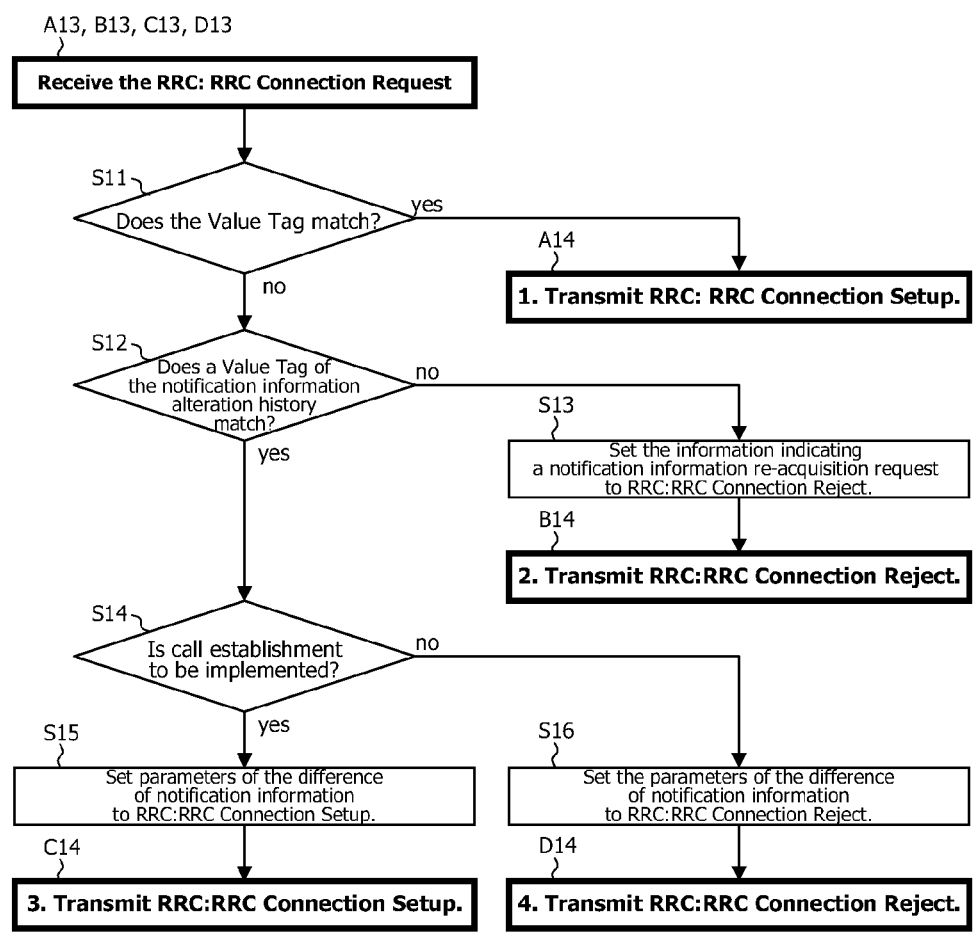
FIG. 12 is a sequence chart for describing the entire sequence of processing of eNB 20 at the time of reception of an RRC Connection Request message in FIGS. 8-11.

In FIG. 8 (as in FIGS. 9-11 to be described hereinbelow), the entire sequence of the processing of eNB 20 at the time of reception of an RRC Connection Request message is shown in FIG. 12 that will be described hereinbelow.

The current example is for the procedure of implementing call establishment when UE 10 is in a state of holding the notification information of the current wireless transmission.

Figure 4:
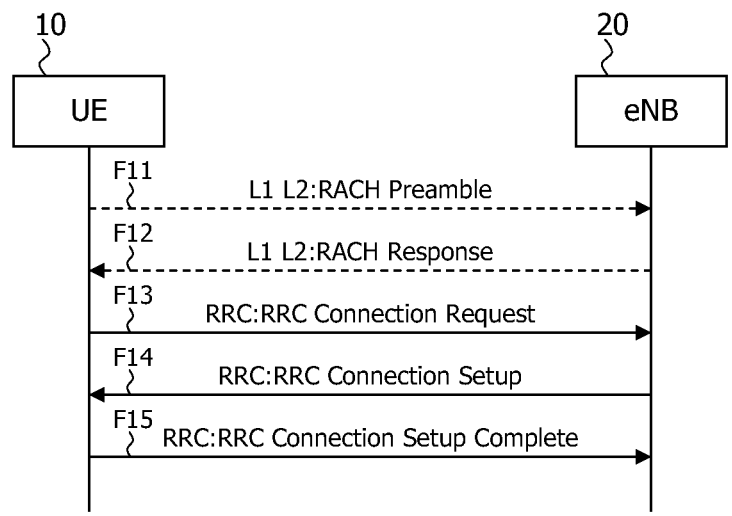
FIG. 4 is a sequence chart for explaining an example of the sequence of establishing an RRC Connection in UTRAN LTE.

First, in Steps A11 and A12, the same RACH procedure as Steps F11 and F12 of FIG. 4 are implemented between UE 10 and eNB 20.

In Step A13, UE 10 next, by means of RRC layer 11, sets the Value Tag that is held in UE 10 to an RRC Connection Request message that requests call establishment and transmits the RRC Connection Request message to eNB 20 by means of transmission unit (Uu) 12A.

In Step S11, eNB 20 next compares by means of control unit 23 the Value Tag that was reported from UE 10 with the Value Tag of the notification information of the current wireless transmission. In this case, the result of the comparison indicates matching, and eNB 20 therefore transmits to UE 10 an RRC Connection Setup message that establishes the call by means of transmission unit (Uu) 22A in Step A14.

UE 10 then transmits by means of transmission unit (Uu) 12A to eNB 20 a RRC Connection Setup Complete message that reports that call establishment has been completed. The establishment of a call is thus completed.

Second Example

Figure 9:
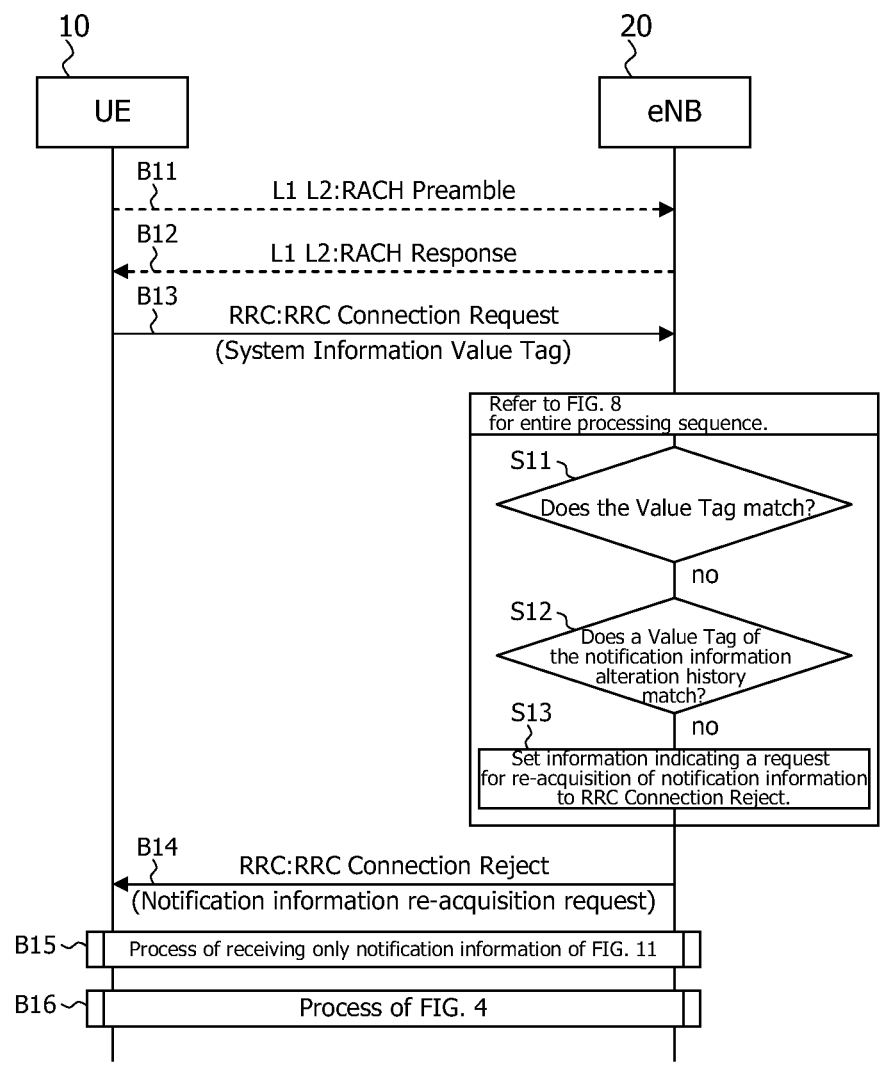
FIG. 9 is a sequence chart for describing a second example of the RRC Connection establishment sequence in the wireless communication system of the present exemplary embodiment.

FIG. 9 shows the RRC Connection establishment sequence in the present example.

The present example is assumed to be a procedure in which UE 10 is in a state of not holding the notification information of the current wireless transmission, and moreover, a procedure in which, after halting the implementation of call establishment, UE 10 receives the notification information of the current wireless transmission and again implements call establishment.

In Steps B11 and B12, the same RACH procedure as Steps F1t and F12 of FIG. 4 is implemented between UE 10 and eNB 20.

In Step B13, UE 10 next, by means of RRC layer 11, sets the Value Tag that is held in UE 10 to an RRC Connection Request message, and transmits the RRC Connection Request message to eNB 20 by means of transmission unit (Uu) 12A.

In Step S11, eNB 20 next, by means of control unit 23, compares the Value Tag that was reported from UE 10 and the Value Tag of the notification information of the current wireless transmission. Because the comparison result here shows non-matching, the process moves on to Step S12.

In Step S12, eNB 20 next, by means of control unit 23, compares the Value Tag that was reported from UE 10 and the Value Tag that is set in the notification information alteration history table (see FIG. 7), i.e., the Value Tag of the past notification information that was previously transmitted by wireless. Because the result of comparison shows non-matching, the process moves on to Step S13.

In Step S13, eNB 20 next, by means of RRC layer 21, sets information that requests the re-acquisition of notification information in an RRC Connection Reject message that rejects call establishment and, by means of transmission unit (Uu) 22A, transmits the RRC Connection Reject message to UE 10 in Step B14.

Figure 3:
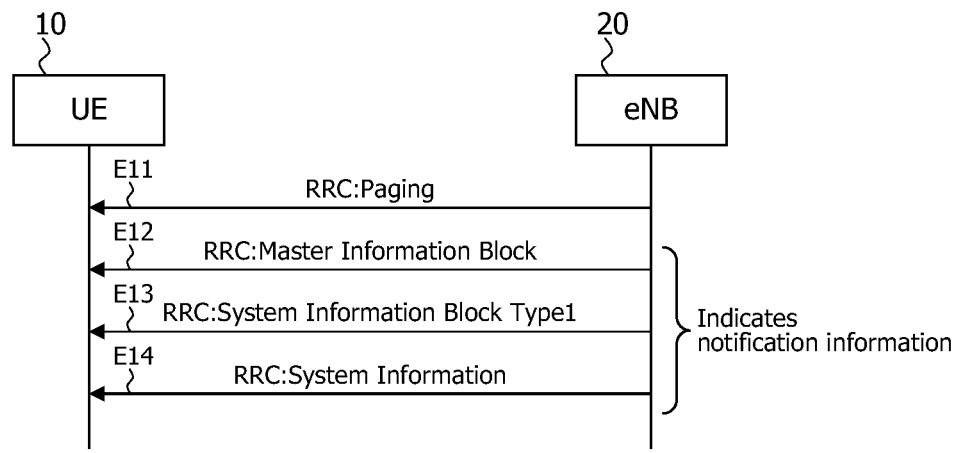
FIG. 3 is a sequence chart for explaining an example of the notification information reception sequence in UTRAN LTE.

In Step B15, UE 10 next implements a process of receiving only the RRC message of the notification information of FIG. 3 by means of reception unit (Uu) 12B.

In Step B16, UE 10 then implements all the processes of FIG. 8 after having updated the values of the Value Tag in UE 10 by means of control unit 13 and establishes the call.

Third Example

Figure 10:
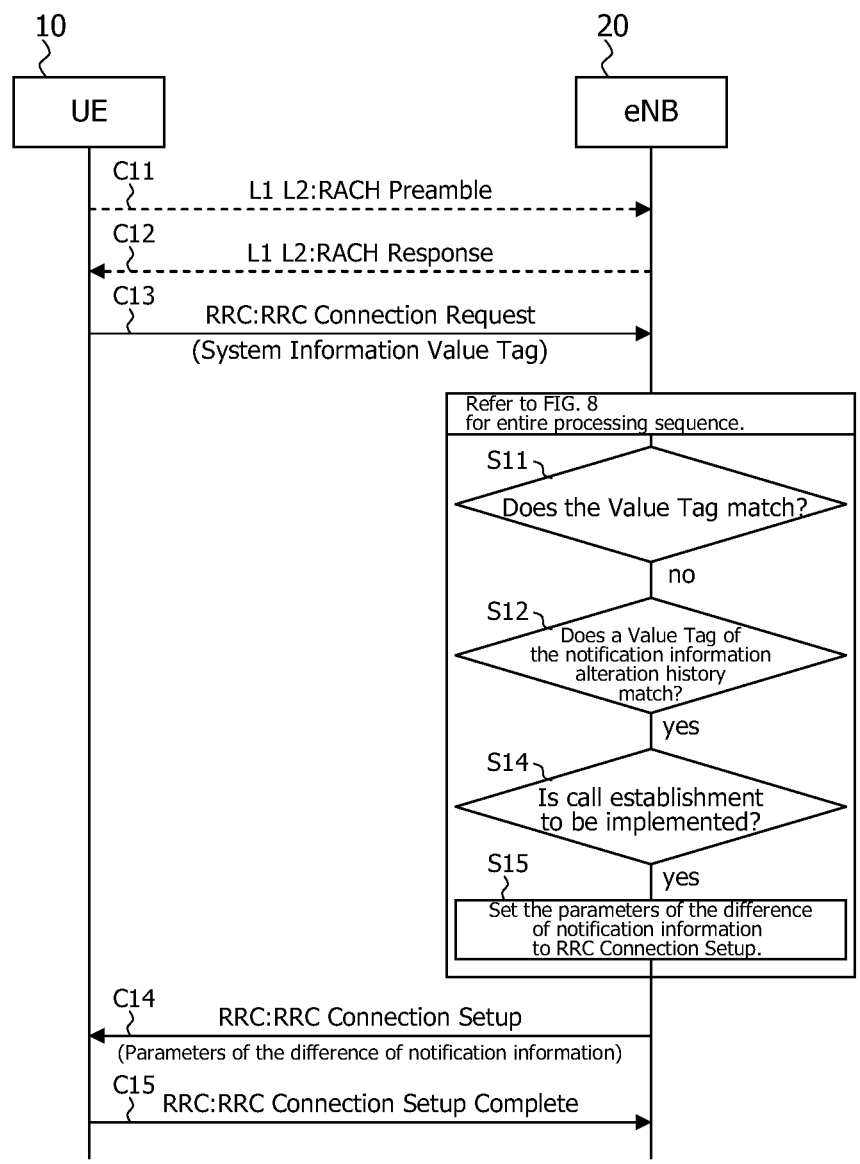
FIG. 10 is a sequence chart for describing a third example of the RRC Connection establishment sequence in the wireless communication system of the present exemplary embodiment.

FIG. 10 shows the RRC Connection establishment sequence in the present example.

The present example is a procedure of implementing call establishment with UE 10 in a state of not holding the notification information of the current wireless transmission, and moreover, a procedure of, without stopping the implementation of call establishment, updating the notification information that is currently held by UE 10 to the notification information of the current wireless transmission and continuing to implement call establishment.

First, in Steps C11 and C12, the same RACH procedure as Steps F1t and F12 in FIG. 4 is implemented between UE 10 and eNB 20.

In Step C13, UE 10 next, by means of RRC layer 11, sets the Value Tag that is held in UE 10 to an RRC Connection Request message, and by means of transmission unit (Uu) 12A, transmits the RRC Connection Request message to eNB 20.

In Step S11, eNB 20 next, by means of control unit 23, compares the Value Tag that was reported from UE 10 with the Value Tag of the notification information of the current wireless transmission. Because the comparison result shows non-matching, the process moves on to Step S12.

In Step S12, eNB 20 next, by means of control unit 23, compares the Value Tag that was reported from UE 10 with the Value Tag that is set in the notification information alteration history table (see FIG. 7). The comparison result shows matching, and the process therefore moves on to Step S14.

In Step S14, eNB 20 next, by means of control unit 23, based on the information of implementation/non-implementation of call establishment that is set in the notification information alteration history table (see FIG. 7) in correspondence with the Value Tag that matched, judges whether to establish the call with UE 10. It is here assumed that the implementation of call establishment is determined, and the process therefore moves on to Step S15.

In Step S15, eNB 20 next, by means of RRC layer 21, sets the parameter of the difference between past notification information that was transmitted by the value of the Value Tag that matched in the process of Step S12 and the notification information of the current wireless transmission and the value of the Value Tag of the notification information of the current wireless transmission in an RRC Connection Setup message and, by means of transmission unit (Uu) 12A, transmits the RRC Connection Setup message to UE 10 in Step C14.

In Step C15, UE 10 then, by means of control unit 13, updates the parameters of the difference between the notification information in UE 10 and the value of the Value Tag, and then, by means of transmission unit (Uu) 12A, transmits an RRC Connection Setup Complete message to eNB 20, whereby call establishment is completed.

Fourth Example

FIG. 11 shows the RRC Connection establishment sequence in the present example.

This example is a procedure of implementing call establishment with UE 10 in a state of not holding notification information of the current wireless transmission, and moreover, a procedure of halting the implementation of call establishment, updating the notification information that is currently held by UE 10 to the notification information of the current wireless transmission, and causing UE 10 to judge whether to again implement call establishment.

First, in Steps D11 and D12, the same RACH procedure as Steps F11 and F12 of FIG. 4 is implemented between UE 10 and eNB 20.

In Step D13, UE 10 next, by means of RRC layer 11, sets the Value Tag that is held in UE 10 to an RRC Connection Request message and, by means of transmission unit (Uu) 12A, transmits the RRC Connection Request message to eNB 20.

In Step S11, eNB 20 next, by means of control unit 23, compares the Value Tag that was reported from UE 10 and the Value Tag of the notification information of the current wireless transmission. Because the comparison result here indicates non-matching, the process moves on to Step S12.

In Step S12, eNB 20 next, by means of control unit 23, compares the Value Tag that was reported from UE 10 and the Value Tag that is set in the notification information alteration history table (see FIG. 7). Because the comparison result here indicates matching, the process moves on to Step S14.

In Step S14, eNB 20 next, by means of control unit 23, judges whether to implement call establishment with UE 10 based on information of implementation/non-implementation of call establishment that is set in notification information alteration history table (see FIG. 7) in correspondence with the Value Tag that matched. It is here assumed that eNB 20 determines not to implement call establishment and the process therefore moves on to Step S16.

In Step S16, eNB 20 next, by means of RRC layer 21, sets the parameters of the difference between past notification information that was transmitted by the value of the Value Tag that matched in the process of Step S12 and the notification information of the current wireless transmission and the value of the Value Tag of the notification information of the current wireless transmission in an RRC Connection Reject message and, by means of transmission unit (Uu) 12A, transmits the RRC Connection Reject message to UE 10 in Step D14.

In Step D15, UE 10 then, by means of control unit 13, after having updated the parameters of the difference between the notification information in UE 10 and the value of the Value Tag, judges whether to again transmit a call establishment request (RRC Connection Request message) based on the updated notification information. The judgment of the transmission of the call establishment request is carried out based on regulation information that is contained in the notification information. For example, when information in which access to eNB 20 is prohibited is set in the regulation information, UE 10 does not transmit a call establishment request.

FIG. 12 shows the entire sequence of processes of eNB 20 when receiving the RRC Connection Request messages in FIGS. 8-11.

The flow of processes up to Step A14 in FIG. 12 corresponds to the first example of FIG. 8, the flow of processes up to Step B14 in FIG. 12 corresponds to the second example of FIG. 9, the flow of processes up to Step C14 in FIG. 12 corresponds to the third example of FIG. 10, and the flow of processes up to Step D14 in FIG. 12 corresponds to the fourth example.

In the present exemplary embodiment as described hereinabove, UE 10 transmits the Value Tag of predetermined notification information to eNB 20, and eNB 20, based on the result of the comparison of the Value Tag that was transmitted in from UE 10 and the Value Tag of the notification information of the current wireless transmission, transmits to UE 10 information for acquiring the notification information of the current transmission.

UE 10 is thus able to acquire the notification information of the current transmission based on the information that is transmitted in from eNB 20.

As a result, UE 10 continues to hold past notification information and, by implementing the call establishment process with eNB 20 based on the past notification information, avoids failure to establish the call or, despite establishing the call, avoids deterioration of communication quality due to establishing the call by means of past notification information.

More specifically, in the present exemplary embodiment, UE 10 sets the Value Tag of the notification information that is held in UE 10 to an RRC Connection Request message and transmits the message to eNB 20.

When the Value Tag that is held in UE 10 does not match the Value Tag of either the notification information of the current transmission or of past notification information, eNB 20 further sets, as information for acquiring the notification information of the current transmission, information requesting the re-acquisition of notification information in a RRC Connection Reject message and transmits the message.

This UE 10 holds notification information that does not match either the notification information of the current transmission or past notification information. As a result, eNB 20 is able to cause UE 10 in this state to re-acquire the notification information of the current transmission.

When the Value Tag that is held in UE 10 matches any Value Tag of past notification information, and moreover, when regulation information is not included in the difference between the past notification information that matched and the notification information of the current transmission, eNB 20 further sets, as information for acquiring the notification information of the current transmission, information of the difference in the notification information and the Value Tag of the notification information of the current transmission in an RRC Connection Setup message and transmits the message.

This UE 10 holds past notification information in which, in the regulation information itself, there is no difference with the notification information of the current transmission, and UE 10 thereby verifies that eNB 20 does not prohibit access and then transmits a call establishment request. As a result, by establishing a call to this type of UE 10 and reporting information of the difference with the notification information of the current transmission, eNB 20 is able to reduce the time during which UE 10 reads all of the notification information of the current transmission, and thus a call can be established in a shorter time.

When the Value Tag that is held in UE 10 matches any Value Tag of past notification information, and moreover, if regulation information is contained in the difference between the past notification information that matched and the notification information of the current transmission, eNB 20 sets, as information for acquiring the notification information of the current transmission, information of the difference of the notification information and the Value Tag of the notification information of the current transmission in an RRC Connection Reject message and transmits the message.

Even in a state in which eNB 20 prohibits access because this UE 10 holds past notification information in which there is a difference in the regulation information with the notification information of the current transmission, UE 10 may in some cases transmit a call establishment request. As a result, eNB 20 halts call establishment for UE 10 that has transmitted in a call establishment request when access is prohibited and, by reporting notification information of the current transmission that includes regulation information that prohibits access to eNB 20, is able to prevent UE 10 from again transmitting a call establishment request.

Although the present invention has been described with reference to an exemplary embodiment, the present invention is not limited to the above-described exemplary embodiment. The constitution and details of the present invention are open to various modifications within the scope of the present invention that will be clear to one of ordinary skill in the art.

For example, in the present exemplary embodiment, a Value Tag that was reported from UE 10 is first compared with the Value Tag of the notification information of the current wireless transmission and the Value Tag reported from UE 10 then compared with Value Tags of past notification information that was previously transmitted by wireless. In other words, comparison is carried out in two steps. In place of this form, the Value Tag that is reported from UE 10 may, for example, be compared at one time with the Value Tag of notification information of the current wireless transmission and notification information that was transmitted in the past. In other words, the present invention may be constituted such that comparison is carried out in one step.

Although an example was described in the present exemplary embodiment in which the present invention is applied to UTRAN LTE, the present invention is not limited to this form and can also be applied to WCDMA (Wideband Code Division Multiple Access).

Figure 1:
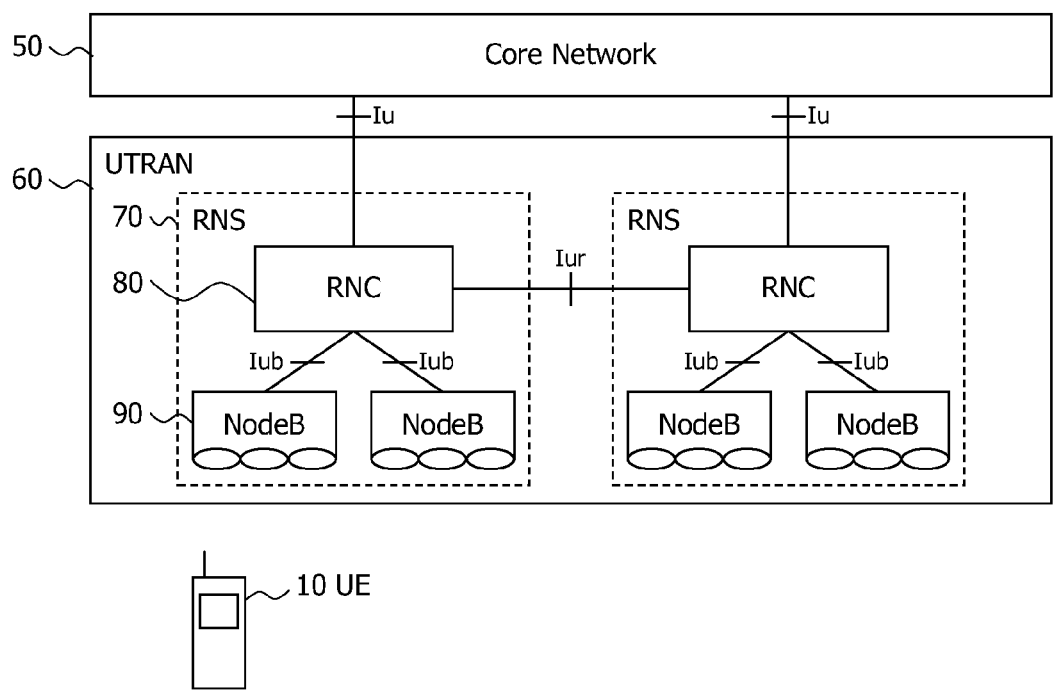
FIG. 1 shows an example of the architecture of a wireless communication system in which UTRAN is applied.

However, when the present invention is applied to WCDMA, the configuration of the wireless communication system must be a configuration in which UTRAN of FIG. 1 is applied. In addition, a process in which UE 10 sets two Value Tags, i.e., a cell value tag and PLMN value tag, to an RRC Connection Request message and transmits the message and a process in which RNC 80 compares each of the two Value Tags with the Value Tag of the notification information of the current transmission and reports the comparison result to NodeB 90 must be added.

The method that is carried out in a wireless base station and a mobile terminal of the present invention may be applied to a program for causing execution by a computer. In addition, this program can be stored in a storage medium and can be offered to the outside by way of a network.

This application claims the benefits of priority based on Japanese Patent Application No. 2008-314748 for which application was submitted on Dec. 10, 2008 and incorporates by citation all of the disclosures of that application.

What is claimed is:

1. A wireless communication system that includes a mobile terminal and a wireless base station that transmits to said mobile terminal notification information that is used for establishing a call between said wireless base station and said mobile terminal; wherein:

said mobile terminal transmits identification information that identifies predetermined notification information to said wireless base station;

said wireless base station compares the identification information that was transmitted in from said mobile terminal with identification information of the notification information of the current transmission, and based on the result of comparison, transmits to said mobile terminal information for acquiring the notification information of the current transmission;

said wireless base station saves identification information of at least one item of past notification information that was previously transmitted; and when as the result of said comparison the identification information that was transmitted in from said mobile terminal does not match identification information of the notification information of the current transmission, said wireless base station compares the identification information that was transmitted in from said mobile terminal with identification information of past notification information, when, as the result of said comparison, the identification information that was transmitted in from said mobile terminal matches any of identification information of past notification information, said wireless base station determines whether regulation information relating to regulation of access to said wireless base station is contained in the difference between the past notification information for which identification information matched and the notification information of the current transmission, when as the result of said determination, regulation information is not contained in the difference of notification information, said wireless base station sets in a message that establishes a call, as information for acquiring the notification information of the current transmission, information of the difference of notification information and identification information of the notification information of the current transmission and transmits the message to said mobile terminal, and when, as the result of said determination, regulation information is contained in the difference of notification information, said wireless base station sets in a message that rejects call establishment, as information for acquiring the notification information of the current transmission, information of the difference of notification information and identification information of the notification information of the current transmission and transmits the message to said mobile terminal.

2. The wireless communication system as set forth in claim 1, wherein said mobile terminal sets, as said predetermined notification information, identification information of notification information that said mobile terminal holds in a message that requests call establishment and transmits the message to said wireless base station.

3. The wireless communication system as set forth in claim 2, wherein: when as the result of said comparison the identification information that was transmitted in from said mobile terminal matches identification information of the notification information of the current transmission, said wireless base station transmits to said mobile terminal a message that establishes a call.

4. The wireless communication system as set forth in claim 1, wherein: when as the result of said comparison, the identification information that was transmitted in from said mobile terminal does not match any of identification information of past notification information, said wireless base station sets, as information for acquiring the notification information of the current transmission, information that requests re-acquisition of notification information in a message that rejects call establishment and transmits the message to said mobile terminal.

5. The wireless communication system as set forth in claim 4, wherein said mobile terminal:
   after acquiring the notification information of the current transmission, updates the identification information of notification information that said mobile terminal holds to identification information of the notification information of the current transmission; and
   sets the updated identification information in a message that requests call establishment and transmits the message to said wireless base station.

6. The wireless communication system as set forth in claim 1, wherein said identification information is a System Information Value Tag.

7. A wireless base station that transmits to a mobile terminal notification information that is used for establishing a call between said mobile terminal and said wireless base station, said wireless base station comprising:
   a receiver that receives from said mobile terminal identification information that identifies predetermined notification information;
   a control unit that compares the identification information that was received from said mobile terminal with identification information of the notification information of the current transmission; and
   a transmitter that both transmits notification information to said mobile terminal and, based on the result of said comparison, transmits to said mobile terminal information for acquiring the notification information of the current transmission,
   wherein said control unit saves identification information of at least one item of past notification information that was previously transmitted, and
   when, as the result of said comparison, the identification information that was received from said mobile terminal does not match identification information of the notification information of the current transmission, compares the identification information that was received from said mobile terminal with identification information of past notification information,
   when, as the result of said comparison, the identification information that was received from said mobile terminal matches any identification information of past notification information, said control unit determines whether regulation information that relates to regulation of access to said wireless base station is contained in the difference between the past notification information for which the identification information matched and the notification information of the current transmission,
   when, as the result of said determination, regulation information is not contained in the difference of notification information, said processor generates a message that establishes a call in which are set, as information for acquiring the notification information of the current transmission, information of the difference of notification information and identification information of the notification information of the current transmission; and said transmitter transmits to said mobile terminal a message that establishes a call in which information of the difference of notification information and identification information of the notification information of the current transmission are set, and
   when, as the result of said determination, regulation information is contained in the difference of notification information, said processor generates a message that rejects call establishment in which are set, as information for acquiring the notification information of the current transmission, information of the difference of notification information and identification information of the notification information of the current transmission; and said transmitter transmits to said mobile terminal a message that rejects call establishment in which information of the difference of notification information and identification information of the notification information of the current transmission are set.

8. The wireless base station as set forth in claim 7, wherein said receiver receives from said mobile terminal a message that requests call establishment in which is set identification information of notification information that is held by said mobile terminal as said predetermined notification information.

9. The wireless base station as set forth in claim 8, further comprising a processor that generates a message that establishes a call when, as the result of said comparison, the identification information that was received from said mobile terminal matches identification information of the notification information of the current transmission; wherein said transmitter transmits to said mobile terminal said message that establishes a call.

10. The wireless base station as set forth in claim 7, wherein:
   when, as the result of said comparison, the identification information that was received from said mobile terminal does not match any identification information of past notification information, said processor generates a message that rejects call establishment in which is set, as information for acquiring the notification information of the current transmission, information that requests the re-acquisition of notification information; and
   said transmitter transmits to said mobile terminal a message that rejects call establishment in which is set information requesting re-acquisition of notification information.

11. The wireless base station as set forth in claim 7, wherein said identification information is a System Information Value Tag.

12. A mobile terminal that receives from a wireless base station notification information that is used for establishing a call between said wireless base station and said mobile terminal; comprising:
- a transmitter that transmits to said wireless base station identification information that identifies predetermined notification information; and
- a receiver that both receives notification information from said wireless base station and, when the identification information that was transmitted to said wireless base station and the identification information of the notification information of the current transmission do not match, receives from said wireless base station information for acquiring the notification information of the current transmission,
- a processor that generates a message that requests call establishment in which identification information of notification information that is held by said mobile terminal is set as said predetermined notification information;
- wherein said transmitter transmits to said wireless base station a message that requests call establishment in which the identification information of notification information that is held by said mobile terminal is set,
- when the identification information that was transmitted to said wireless base station does not match identification information of the notification information of the current transmission but matches any identification information of past notification information, and moreover, the difference between the past notification information for which identification information matched and the notification information of the current transmission does not contain regulation information relating to regulation of access to said wireless base station, said receiver receives from said wireless base station, as information for acquiring the notification information of the current transmission, a message that establishes a call in which are set information of the difference of notification information and identification information of the notification information of the current transmission, and
- when the identification information that was transmitted to said wireless base station does not match identification information of the notification information of the current transmission but matches any identification information of past notification information, and moreover, regulation information relating to regulation of access to said wireless base station is contained in the difference between the past notification information for which identification information matched and the notification information of the current transmission, said receiver receives, as information for acquiring the notification information of the current transmission, a message that rejects call establishment in which are set information of the difference of notification information and identification information of the notification information of the current transmission.

13. The mobile terminal as set forth in claim 12, wherein when the identification information that was transmitted to said wireless base station and identification information of the notification information of the current transmission match, said receiver receives from said wireless base station a message that establishes a call.

14. The mobile station as set forth in claim 12, wherein, when the identification information that was transmitted to said wireless base station does not match any identification information of past notification information or the notification information of the current transmission, said receiver receives from said wireless base station, as information for acquiring the notification information of the current transmission, a message that rejects call establishment in which information that requests the re-acquisition of notification information is set.

15. The mobile terminal as set forth in claim 14, further comprising a control unit that, after acquiring the notification information of the current transmission, updates identification information of notification information that said mobile terminal holds to identification information of the notification information of the current transmission;
- wherein said processor generates a message that requests call establishment in which the updated identification information is set; and
- said transmitter transmits to said wireless base station a message that requests call establishment in which the updated identification information is set.

16. The mobile terminal as set forth in claim 12, wherein said identification information is a System Information Value Tag.

17. A wireless communication method that is realized by a wireless communication system that includes a mobile terminal and a wireless base station that transmits to said mobile terminal notification information that is used for establishing a call between said mobile terminal and wireless base station; said wireless communication method comprising steps of:
- said mobile terminal transmitting to said wireless base station identification information that identifies predetermined notification information;
- said wireless base station comparing the identification information that was transmitted in from said mobile terminal and identification information of the notification information of the current transmission; and
- said wireless base station, based on the result of said comparison, transmitting to said mobile terminal information for acquiring the notification information of the current transmission;
- said wireless base station saves identification information of at least one item of past notification information that was previously transmitted; and
- when as the result of said comparison the identification information that was transmitted in from said mobile terminal does not match identification information of the notification information of the current transmission, said wireless base station compares the identification information that was transmitted in from said mobile terminal with identification information of past notification information,
- when, as the result of said comparison, the identification information that was transmitted in from said mobile terminal matches any of identification information of past notification information, said wireless base station determines whether regulation information relating to regulation of access to said wireless base station is contained in the difference between the past notification information for which identification information matched and the notification information of the current transmission,
- when as the result of said determination, regulation information is not contained in the difference of notification information, said wireless base station sets in a message that establishes a call, as information for acquiring the notification information of the current transmission, information of the difference of notification information and identification information of the notification information of the current transmission and transmits the message to said mobile terminal, and when, as the result of said determination, regulation information is contained in the difference of notification information, said wireless base station sets in a message that rejects call establishment, as information for acquiring the notification information of the current transmission, information of the difference of notification information and identification information of the notification information of the current transmission and transmits the message to said mobile terminal.

18. A wireless communication method that is realized by a wireless base station that transmits to a mobile terminal notification information used for establishing a call between said mobile terminal and said wireless base station, said wireless communication method comprising steps of:
- receiving from said mobile terminal identification information that identifies predetermined notification information;
- comparing the identification information that was received from said mobile terminal and identification information of the notification information of the current transmission; and
- based on the result of said comparison, transmitting to said mobile terminal information for acquiring the notification information of the current transmission;
- saving identification information of at least one item of past notification information that was previously transmitted; and
- when as the result of said comparison the identification information that was received from said mobile terminal does not match identification information of the notification information of the current transmission, comparing the identification information that was received from said mobile terminal with identification information of past notification information,
- when, as the result of said comparison, the identification information that was received from said mobile terminal matches any identification information of past notification information, said control unit determines whether regulation information that relates to regulation of access to said wireless base station is contained in the difference between the past notification information for which the identification information matched and the notification information of the current transmission,
- when, as the result of said determination, regulation information is not contained in the difference of notification information, said processor generates a message that establishes a call in which are set, as information for acquiring the notification information of the current transmission, information of the difference of notification information and identification information of the notification information of the current transmission; and said transmitter transmits to said mobile terminal a message that establishes a call in which information of the difference of notification information and identification information of the notification information of the current transmission are set, and
- when, as the result of said determination, regulation information is contained in the difference of notification information, said processor generates a message that rejects call establishment in which are set, as information for acquiring the notification information of the current transmission, information of the difference of notification information and identification information of the notification information of the current transmission; and said transmitter transmits to said mobile terminal a message that rejects call establishment in which information of the difference of notification information and identification information of the notification information of the current transmission are set.

19. A wireless communication method that is realized by a mobile terminal that receives from a wireless base station notification information that is used for establishing a call between said wireless base station and said mobile terminal, said wireless communication method comprising steps of:
- transmitting to said wireless base station identification information that identifies predetermined notification information; and
- when the identification information that was transmitted to said wireless base station does not match identification information of the notification information of the current transmission, receiving from said wireless base station information for acquiring the notification information of the current transmission,
- generating a message that requests call establishment in which identification information of notification information that is held by said mobile terminal is set as said predetermined notification information;
- wherein said transmitting transmits to said wireless base station a message that requests call establishment in which the identification information of notification information that is held by said mobile terminal is set,
- when the identification information that was transmitted to said wireless base station does not match identification information of the notification information of the current transmission but matches any identification information of past notification information, and moreover, the difference between the past notification information for which identification information matched and the notification information of the current transmission does not contain regulation information relating to regulation of access to said wireless base station, said receiver receives from said wireless base station, as information for acquiring the notification information of the current transmission, a message that establishes a call in which are set information of the difference of notification information and identification information of the notification information of the current transmission, and
- when the identification information that was transmitted to said wireless base station does not match identification information of the notification information of the current transmission but matches any identification information of past notification information, and moreover, regulation information relating to regulation of access to said wireless base station is contained in the difference between the past notification information for which identification information matched and the notification information of the current transmission, said receiver receives, as information for acquiring the notification information of the current transmission, a message that rejects call establishment in which are set information of the difference of notification information and identification information of the notification information of the current transmission.

* * * * *